United States Patent
Dasilva et al.

(10) Patent No.: US 10,740,713 B2
(45) Date of Patent: Aug. 11, 2020

(54) GENERATION OF WBS MODEL DATA

(71) Applicant: International Business Machines Corporation, Armonk, NY (US)

(72) Inventors: Sergio H. Dasilva, Miami, FL (US); Tao Liu, Beijing (CN); Michael Starkey, Vancouver (CA); Hao Zong Qi, Beijing (CN); Cun Xiang Zhang, Beijing (CN); Yan Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 13/785,032

(22) Filed: Mar. 5, 2013

(65) Prior Publication Data

US 2013/0290215 A1 Oct. 31, 2013

(30) Foreign Application Priority Data

Apr. 27, 2012 (CN) .......................... 2012 1 0130373

(51) Int. Cl.
*G06Q 10/06* (2012.01)
(52) U.S. Cl.
CPC ....... *G06Q 10/067* (2013.01); *G06Q 10/0633* (2013.01); *G06Q 10/06311* (2013.01); *G06Q 10/06315* (2013.01)
(58) Field of Classification Search
None
See application file for complete search history.

(56) References Cited

U.S. PATENT DOCUMENTS

| | | | | |
|---|---|---|---|---|
| 5,848,394 A | * | 12/1998 | D'Arrigo | ........... G06Q 10/0631 705/7.12 |
| 6,615,166 B1 | * | 9/2003 | Guheen | .................. G06Q 10/06 703/26 |
| 6,662,357 B1 | * | 12/2003 | Bowman-Amuah | ..... G06F 8/20 717/120 |
| 8,006,223 B2 | | 8/2011 | Boulineau et al. | |

(Continued)

FOREIGN PATENT DOCUMENTS

| | | |
|---|---|---|
| CN | 101266669 | 9/2008 |
| CN | 101447067 | 6/2009 |

(Continued)

OTHER PUBLICATIONS

Harada et al.; Project Management System Based on Work-Breakdown-Structure Process Model; Unifying the Software Process Spectrum Lectures Notes in Computer Science; 2005; pp. 249-261.

(Continued)

*Primary Examiner* — Susanna M. Diaz
(74) *Attorney, Agent, or Firm* — Schmeiser, Olsen & Watts, LLP; Mark Vallone

(57) ABSTRACT

A method and system for generating a work breakdown structure (WBS) model data. Design model data is received. The design model data is parsed to extract WBS metadata from the design model data. A WBS template corresponding to the design model data is determined. The WBS model data is generated using the determined WBS template and the extracted WBS metadata. The WBS model data includes data entries. Each data entry is associated with a respective work task.

9 Claims, 6 Drawing Sheets

(56) References Cited

U.S. PATENT DOCUMENTS

| | | | |
|---|---|---|---|
| 8,055,606 B2 | 11/2011 | Kreamer et al. | |
| 2001/0041999 A1* | 11/2001 | Young | G06Q 10/04 705/7.26 |
| 2002/0120486 A1* | 8/2002 | Thompson | G06Q 10/06 705/7.17 |
| 2002/0194053 A1* | 12/2002 | Barrett | G06Q 10/06 705/7.25 |
| 2003/0144953 A1* | 7/2003 | Razum | G06Q 10/06 705/40 |
| 2004/0205657 A1* | 10/2004 | Kudo | G06F 17/2241 715/205 |
| 2005/0234758 A1* | 10/2005 | Nishi | G06Q 10/06 705/80 |
| 2006/0053043 A1* | 3/2006 | Clarke | G06Q 10/063118 705/7.17 |
| 2006/0064667 A1* | 3/2006 | Freitas | G06F 8/35 717/104 |
| 2006/0293939 A1* | 12/2006 | Sun | G06Q 10/06 705/7.14 |
| 2008/0059516 A1 | 3/2008 | Cui et al. | |
| 2008/0177565 A1 | 7/2008 | Sun et al. | |
| 2009/0276281 A1* | 11/2009 | Foltz | G06Q 10/06 705/7.14 |
| 2010/0017256 A1 | 1/2010 | Murata et al. | |
| 2010/0318392 A1* | 12/2010 | Cassels | G06Q 10/06 705/7.12 |

FOREIGN PATENT DOCUMENTS

| | | |
|---|---|---|
| CN | 101799894 | 8/2010 |
| CN | 102004972 | 4/2011 |
| CN | 102073949 | 5/2011 |

OTHER PUBLICATIONS

Zhang et al.; A New Method for Generating Work Breakdown Structure on Aircraft Assembly Scheduling; 4th International Conference on Wireless Communications, Networking and Mobile Computing; Apr. 2008; 4 pages.

Wikipedia, Work breakdown structure, p. 1, retrieved on Jun. 10, 2018 from the Internet: <URL: https://en.wikipedia.org/wiki/Work_breakdown_structure>.

"Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>", 7 pages.

\* cited by examiner

```
<Class base_effort= "1"  unit= "PD" >
  <operation base_effort="2" unit="PD">
    <attribute base_effort="1" unit="PD">
    <risk base_buffer="4" unit="PD">
</Class>
```

Fig. 4C

| Task ID | Task |
|---|---|
| 2.1 | 'CarAssembler' Development |
| 2.1.1 | Design 'CarAssembler' |
| 2.1.2 | Implement 'CarAssembler' |
| 2.1.3 | Test 'CarAssembler' |
| 2.1.4 | Compose document of 'CarAssembler' |
| Task property | Dependency task(s): |
| Task property | Effort Complexity: |
| Task property | Risk Complexity: |

Fig. 4D

| Task ID | Task |
|---|---|
| 2.1 | 'CarAssembler' Development |
| 2.1.1 | Design 'CarAssembler' |
| 2.1.2 | Implement 'CarAssembler' |
| 2.1.3 | Test 'CarAssembler' |
| 2.1.4 | Compose document of 'CarAssembler' |
| Task property | Dependency task(s) #1.1 |
| Task property | Effort Complexity: 7 PD |
| Task property | Risk Complexity: 4 PD |

Fig. 4E

GENERATION OF WBS MODEL DATA

TECHNICAL FIELD

The present invention relates to generation of a work breakdown structure WBS model data, and more specifically, to generation of WBS model data using a WBS template based on design model data.

BACKGROUND

At present, during the process of application development, the Model Driven Development MDD pattern has gained an increasingly wide application.

However, current usage of the MDD pattern to formulate a detailed work breakdown structure (WBS) data model requires artificially understanding an application model which leads to inaccuracies in the formulated WBS model such that the WBS model cannot guide the development work well. Besides, since the application model might be frequently adjusted or modified during the program development process, even a minor modification of the application model could lead to great impact on the work task data in the WBS model, it would be extremely difficult to artificially modify WBS model data and guarantee its accuracy and fineness.

BRIEF SUMMARY

The present invention provides a method, system and computer program product for generating a work breakdown structure (WBS) model data. The method comprises: a processor of a computer system receiving design model data; said processor parsing the design model data to extract WBS metadata from the design model data; said processor determining a WBS template corresponding to the design model data; and said processor generating the WBS model data using the determined WBS template and the extracted WBS metadata, said WBS model data comprising data entries, each data entry associated with a respective work task.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIGS. 4A-4E show instance diagrams of a process of generating WBS model data, according to embodiments of the present invention.

DETAILED DESCRIPTION

Figure 1:
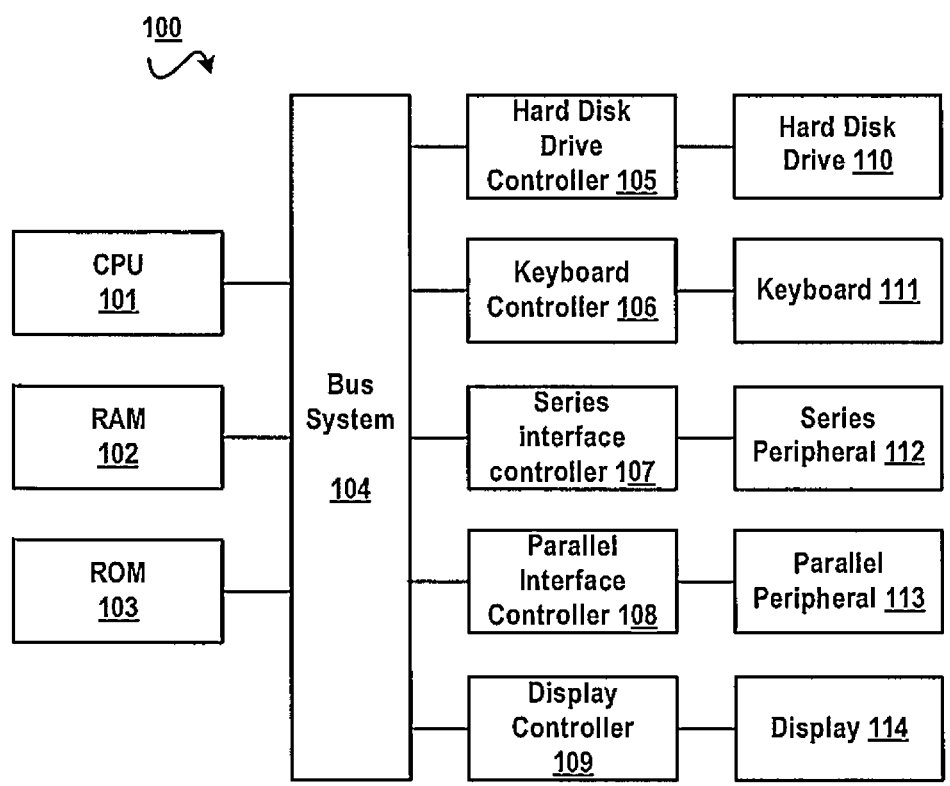
FIG. 1 shows an exemplary computer system which is applicable to implement embodiments of the present invention.

An objective of the present invention is to provide a method and system capable of automatically generating work breakdown structure (WBS) model data based on design model data. Another objective of the present invention is to provide a method and system capable of quickly performing a corresponding modification to a WBS model in response to a modification to design model data. It should be emphasized that the present invention does not intend to solve any problem regarding management methodology or management rules in any workflow management, but focuses on a technical solution of how to automatically generating WBS model data from design model data.

According to one embodiment of the present invention, there is provided a method of generating work breakdown structure WBS model data based on design model data, comprising: receiving design model data; parsing WBS metadata of the design model data; determining a WBS template corresponding to the design model data; and generating WBS model data using the determined WBS template and the parsed WBS metadata.

According to another embodiment of the present invention, there is provided a system of generating work breakdown structure WBS model data based on design model data, comprising: receiving means configured to receive design model data; parsing means configured to parse WBS metadata of the design model data; template determining means configured to determine a WBS template corresponding to the design model data; and WBS model data generating means configured to generate WBS model data using the determined WBS template and the parsed WBS metadata.

According to the method or system as provided in the present invention, it is possible to automatically generate WBS model data based on design model data, and even if the design model data are modified, the WBS model can still be modified correspondingly in an automatic and quick manner using the method.

In the text below, a method and system of generating work breakdown structure WBS model data based on design model data according to the present invention will be described in detail by describing embodiments with reference to the figures.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product comprising one or more computer readable medium(s) or device(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, hardware apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible hardware medium or device that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the flowchart and/or block diagram block or blocks.

FIG. 1 shows an exemplary computer system 100 which is applicable to implement embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

A computer program product of the present invention may comprise a computer readable storage medium or device having computer readable program code stored therein, wherein the program code contains instructions which, upon being executed by the processor 101 of the computer system 100, implement methods of the present invention.

The computer system 100 may comprise the processor 101, a memory (e.g., 102, 103) coupled to the processor, and a computer readable storage device (e.g., 110) coupled to the processor, wherein the storage device contains program code which, upon being executed by the processor, implements methods of the present invention.

Figure 2:
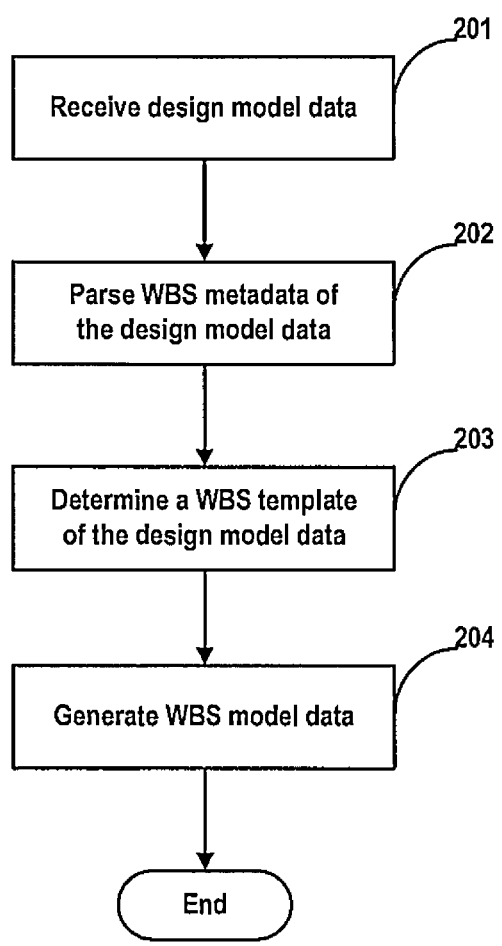
FIG. 2 shows a flow chart of a method of generating work breakdown structure (WBS) model data based on design model data, according to embodiments of the present invention.

FIG. 2 shows a flow chart of a method of generating work breakdown structure WBS model data based on design model data according to embodiments of the present invention.

The method of FIG. 2 starts from step 201. In step 201, design model data are received. According to one embodiment of the present invention, design model data refer to an application model designed as required by a user in order to develop an application. Generally, an application model describes what an application may include. For example, an application may include functional components and classes, and each class may include operations, etc. According to a further embodiment of the present invention, the design model data are data based on the development objective of an application, for example, building design model data in the construction industry.

The design model data includes WBS metadata structured as a plurality of classes. Each class may comprise one or more subclasses (e.g., a plurality of subclasses).

According to one embodiment of the present invention, the design model data received in step 201 are data files in particular formats. These particular formats might include, but be not limited to, XML, UML2, AutoCAD, etc. Of course, the design model data could also be data files that do not conform to a general particular format standard.

Next, the method of FIG. 2 proceeds to step 202 to parse the design model data to extract the WBS metadata from the design model data. The "WBS metadata" here refer to those metadata for generating work breakdown structure WBS model data in the design model data. With an application model as an example, which is design model data, because the application model data include data contents such as functional components, classes, operations included in the classes, of the application, the names and other parameters of such components, the present invention enables classes, operations, attributes, etc. to be extracted from the design model data by parsing an application model data file of the design model data. For example, as far as "component" is concerned, its name, description and other information may be extracted by parsing the design model data. Components, classes, operations, attributes, and dependency information between each class may be parsed out as WBS metadata. The dependency information pertains to a class dependent on prior implementation of another class. Such dependency information is helpful to ordering the tasks in WBS model data. A corresponding parsing method may be adopted to parse design model data in different formats.

In one embodiment, it is completely possible to extract WBS metadata included therein for generating WBS model data by adopting a corresponding parsing method based on the format characteristics or specifications of this design model data.

Next, the method of FIG. 2 proceeds to step 203 to determine a WBS template corresponding to the design model data. According to one embodiment of the present invention, the WBS template is a template in a format for the particular design model data and including basic structural information of WBS model data to be generated. For example, for design model data in UML format, it is required to use a WBS template in UML format. Besides, the WBS template may be formulated with respect to a particular scene or industry. For example, in a scene of application development, the actual development work comprises stages of design, implementation, and test. These stages will not be embodied in the application data model (because the design model data merely concerns what kind of application should be designed, without concerning the specific design work flow). Thus, in order to include these actual existing tasks into the generated WBS model data, these contents may be customized in advance in the WBS template. FIG. 4C shows an instance of a WBS template based on a application design model in UML format.

According to one embodiment of the present invention, the WBS template is customized and stored in advance, while in the actual running process, a matching WBS template is determined based on format information of each design model data. According to another embodiment of the present invention, the WBS template is not customized in advance, but a suitable WBS template is customized temporarily based on each design model data or formed by partially modifying a pre-customized WBS template.

The method of FIG. 2 proceeds to step 204, where WBS model data are generated using the WBS template determined in step 203 and the WBS metadata extracted from the design model data in step 202. The WBS model data are used for breaking down work tasks in a project management process and arranging an execution sequence of respective tasks. Thus, they are hierarchical tree-structure data. Simply put, the specific process of generating WBS model data may be understood as a process of mapping data in the WBS template to the parsed metadata in the design model data and outputting the mapped result as the WBS model data. Specifically, generating WBS model data may comprise generating basic data entries of WBS model data and then adding complexity value and dependency data and other contents to the basic data entries. Data contents, fineness (granularity), and other information to be included in the WBS model data may set or modified on the basis of requirement in the specific project management, and such setting and modification may be implemented by formulating or modifying the WBS template. However, whatever it is, WBS model data can be undoubtedly generated based on the WBS template and the parsed WBS metadata of the design model data, because as above mentioned, the WBS template has included the basic structural information of the WBS model data to be generated, while the WBS metadata in the design model data belong to specific data content in the WBS model data. According to one embodiment of the present invention, the generated WBS model data are in RTC format. According to another embodiment of the present invention, the generated WBS model data are in MPP format. According to a further embodiment of the present invention, the generated WBS model data are in Excel format. In one embodiment, WBS model data in different formats can be generated as required. Hereinafter, some specific embodiments of generating WBS model data will be described with reference to FIGS. 3 and 4.

It should be further noted that steps 202 and 203 in FIG. 2 are not limited in their execution sequence. In other words, the WBS metadata in the design model data may be parsed first, or a WBS template corresponding to the design model data may be determined first.

It can be seen that through the method of FIG. 2, the WBS model data are automatically generated based on design model data. It also can be seen that even if the design model data are modified, corresponding modification may also be performed to the WBS model automatically and quickly by using the method shown in FIG. 2.

It should be further noted that the method of FIG. 2 may not only process static design model data, but also generate WBS model data based on a dynamic design model data. With dynamic design model data the design model might include a dynamic call relationship between model elements. For example, the operation and implementation of a class are realized by calling operations of other classes according to a certain sequence logic relationship. In the case that the design model data are dynamic design model data, the present invention has a more outstanding effect (i.e., generating the WBS model data more accurately).

Figure 3:
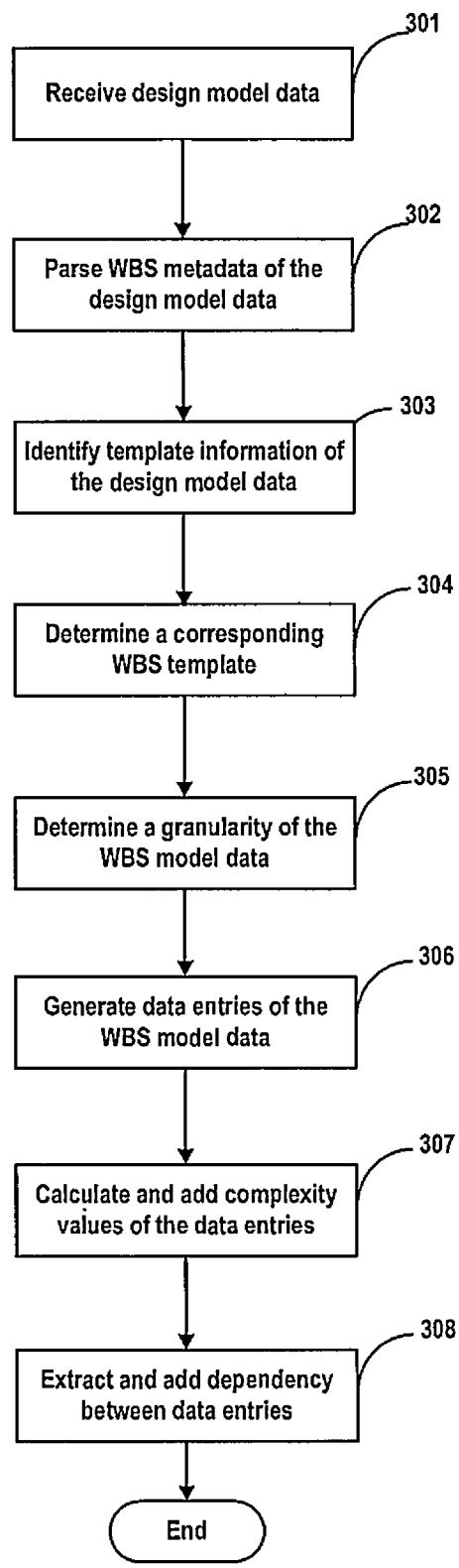
FIG. 3 shows a flow chart of a method of generating work breakdown structure WBS model data based on design model data, according to embodiments of the present invention.

FIG. 3 shows a flow chart of a method of generating work breakdown structure WBS model data based on design model data according to embodiments of the present invention.

The method of FIG. 3 starts from step 301 to receive design model data. Step 301 may be understood as corresponding to step 201 in the method shown in FIG. 2 and thus will not be detailed here.

In step 302, WBS metadata of the design model data are parsed. Step 302 may be understood as corresponding to step 202 in the method shown in FIG. 2 and will thus not be detailed here.

Steps 303 and 304 in FIG. 3 may be understood as corresponding to step 203 shown in FIG. 2. In step 303, template information in the design model data is identified. According to one embodiment of the present invention, the "template information" here is data format information in the design model data and conforming to some particular standard or specification, for example, UML format, Auto-CAD format, XML format, etc. According to one embodiment of the present invention, the template information in the design model data is identified by extracting a particular format identifier in the design model data. For example, for a UML format data file, there is an identifier at a particular location of the file to indicate its compliance with the UML specifications. The template information for design model data in different formats can be identified by different approaches.

In step 304, a WBS template corresponding to the design model data is determined using the data format of the identified template information. Because the format of the design model data has been identified, a corresponding WBS template may be matched from a WBS template base.

Next, the method shown in FIG. 3 proceeds to step 305 to determine granularity of the WBS model data. Here, the granularity refers to fineness; i.e., at which level each basic data entry (indicating each task in the work flow) in the WBS model data is given. Thus, the granularity may denote a level at which the work tasks in the WBS model data are differentiated. For example, the WBS model data may be generated at the level granularity of class (work tasks are differentiated to class), or the WBS model data may be generated at the level granularity of each operation in a class (work tasks are differentiated to each operation within a class). According to one embodiment of the present invention, determining a granularity of the WBS model data in step 305 is performed by extracting granularity information in the WBS template. According to a further embodiment of the present invention, the granularity of the WBS model data as determined in step 305 is temporarily assigned, and a WBS template conforming to the assigned granularity is searched in a WBS template base based on the assigned granularity. In one embodiment, the granularity is at a class level, wherein the WBS metadata may comprise a plurality of classes, wherein each class may comprise one or more subclasses.

Next, the method shown in FIG. 3 proceeds to step 306 to generate basic data entries of the WBS model data using the determined granularity of the WBS model data. A basic data entry refers to each data item in the WBS model data, and in the project management field, it represents each specific work task. According to one embodiment of the present invention, the actual content of a basic data entry may have two sources, in which one source is the WBS metadata in the design model data (for example, functional component, class, operation, etc.); and the other source is customized content in the WBS template (for example, stages like design stage, implementation stage, and test stage, which are essential for each class). These contents are not included in the design model data, but belong to essential data in the WBS model data. The WBS model data as generated after executing step 306 may merely comprise these basic data entries, without complexity information (e.g., indicating the time or manpower consumed for each work task) or dependency information (e.g., indicating whether execution of a work task must be dependent upon a complete implementation of other work tasks), and other information of each data entry.

Next, step 307 includes calculating and adding (i.e., inserting) complexity values of data entries to the basic data entries of the WBS model data. According to one embodiment of the present invention, step 307 comprises: extracting unit task complexity data in the WBS template; calculating the complexity values of the data entries in the WBS model data by utilizing the unit task complexity data and the WBS metadata in the design model data; and adding the calculated complexity values to the data entries. Here, "complexity value" refers to an attribute value of data entries in the WBS model data and may be used to represent the required time and effort (e.g., manpower) predicted to be consumed for performing each work task, and "unit task complexity data" in the WBS template refers to a unit task complexity value for each functional component, each class or each operation as customized in the WBS template. Based on the unit task complexity data in combination with the parsed WBS metadata in the design model data, a total complexity value for each specific work task in WBS model data may be calculated (e.g., by multiplication and add operations).

According to one embodiment of the present invention, the unit task complexity data in the WBS template comprise one or more of the following: internal complexity data, external complexity data, and buffer complexity data, wherein the "internal complexity data" refers to the complexity value of each WBS metadata itself in the design model data, the "external complexity data" refers to additional complexity value incurred by the dependency of each WBS metadata on other WBS metadata, and the "buffer complexity data" refers to additional complexity value that is set in the WBS template for the sake of buffering project execution progress. From the perspective of data processing, the above three types of unit task complexity data set in the WBS template are three kinds of basic unit data for calculating complexity values of data entries in the WBS model data, and regardless of the actual physical meaning or commercial meaning represented thereby, it will not affect realization of the data processing objective of the present invention. The above explanations on the meanings of the three kinds of unit task complexity data do not constitute any limitation to the present invention. In one embodiment, various kinds of other different unit task complexity data may be introduced into the WBS template and set different unit complexity data values based on various reasons.

Next, the method of FIG. 3 proceeds to step 308 to extract and add the complexity values of data entries into the basic data entries of the WBS model data. According to one embodiment of the present invention, step 308 comprises: extracting dependency information of the parsed WBS metadata of the design model data; and adding the extracted dependency information into the basic data entries of the WBS model data. According to one embodiment of the present invention, the dependency in the WBS metadata is present in the application design model as an implicit dependency between each class. It may be implemented using a solution in the prior art how to extract the implicit dependency between each class in the application design model, which will not be detailed here. In one embodiment, the dependency in the design model data might vary with different types of design model data and correspondingly, the dependency may be extracted in different manners. The extracted dependency, as an attribute value of a data entry, is added to the data entry of the WBS model data and may be used to represent a execution sequence between each work task.

It should be noted that there is no strict execution sequence between respective steps in FIG. 3. For example, the complexity values of data entries may be first calculated and added (step 307), and then the dependency between data entries may be extracted and added (step 308); or step 308 may be executed first, and then step 307 is executed.

Besides, some steps in FIG. 3 are not essential for realizing the objectives of the present invention. For example, even without steps 307 and 308, the WBS model data can still be generated using the WBS template and the parsed WBS metadata in the design model data, except that the WBS model data do not comprise content such as complexity value, dependency, and the like. As far as step 305 is concerned, if the WBS template is formulated based on existing design model data, then the granularity therebetween is uniform, and thus it would be unnecessary to further determine the granularity of the WBS model data.

FIGS. 4A-4E (collectively, "FIG. 4") show instance diagrams of a process of generating WBS model data according to embodiments of the present invention.

Figure 4A:
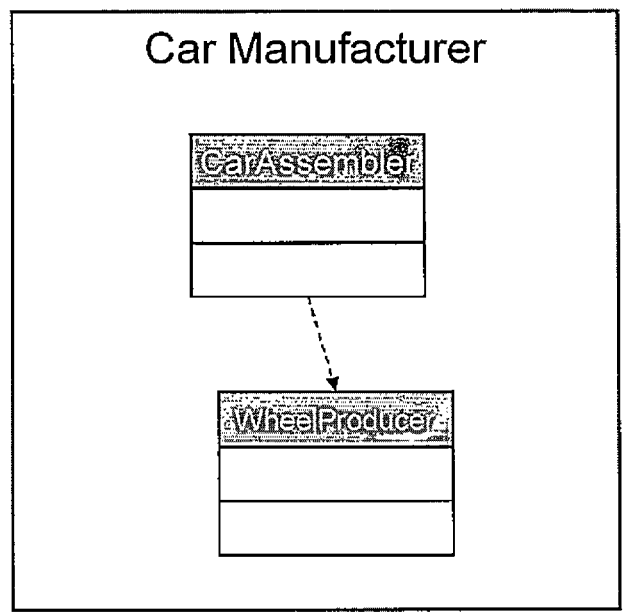

FIG. 4A shows a diagram of design model data. As shown in FIG. 4A, "Car Manufacturer" is a component in the design model data. "Car Manufacturer" comprises two classes, i.e., "CarAssembler" and "WheelProducer." Further, "CarAssembler" is dependent on "WheelProducer," where the dotted-line arrow indicates a dependency. It should be noted that the dotted-line arrow in FIG. 4A is only for indicating the dependency more prominently, and such arrow might not exist in actual design model data, and a dependency between classes may be analyzed and extracted. Generally, a class comprises at least one subclass.

Figure 4B:
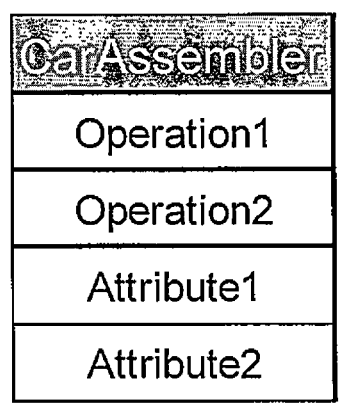

Further, FIG. 4B shows the details of the class "CarAssembler." As shown in FIG. 4B, the class "CarAssembler" comprises an operation subclass and an attribute subclass. The operation subclass includes two elements, namely the operations of Operation1 and Operation2. The attribute subclass includes two elements, namely the attributes of Attribute1 and Attribute2. The WBS metadata in the design model data of FIG. 4A, such as component "Car Manufacturer" (including its name and description), classes "CarAssembler" and "WheelProducer" (including their names, descriptions and dependency), the operations "operation1" and "operation2"(including their names and parameters) in the class "CarAssembler," and the attributes "attribute1" and "attribute2" are all parsed out as the WBS metadata. Generally, a subclass of a class comprises at least one element.

FIG. 4C shows a WBS template matching the design model data. From the content of the template, it can be seen that for a class, the basic cost (base_effort), i.e., the value of unit task complexity data, is 1, with a unit of "PD" (indicating person date); while the value of the unit task complexity data for each operation in the class is 2, with a unit of "PD"; the value of the unit task complexity data for each attribute in the class is 1, with a unit of "PD."

By virtue of the WBS template showin in FIG. 4C and the parsed metadata in the design model data shown in FIG. 4A, it may be determined that the granularity of the WBS model data to be generated is class (because the structural definition has been made in the WBS template based on class). The basic data entries of the WBS model data as shown in FIG. 4D may be generated at the class level. It can be seen from FIG. 4D that the class "CarAssembler," as 2.1 data entry in the WBS model data (according to the default rules of WBS, the "Development" identifier is automatically added when metadata in a design model are reflected in WBS model data) further comprises thereunder 2.1.1-2.1.4 four sub-data entries which may be understood as three sub-tasks. The appearance of the four sub-data entries is based on a configuration in the WBS template. F or each item of WBS metadata in the design model data, the four items of sub-data entries may be automatically added, designed, implemented, tested, and recorded in a file. Besides, the lower portions of the basic data entries of FIG. 4D are several attributes regarding the 2.1 data entry, including dependency, complexity value, risk complexity value, all of which are in a blank state waiting for input. These values may be determined in combination with the WBS template and the specific data contents in the design data model, as illustrated below.

Because the class "CarAssembler" has two operations and two attributes, and according to the definition of the WBS template, a class itself also has a complexity value. Thus the calculation process of the total complexity value regarding the class "CarAssembler" (also the basic data entry 2.1 in FIG. 4D) comprises:

--- calculating a operation complexity value of the class "CarAssembler" as 2×2=4PD based on <operation base_effort="2" unit="PD"> in the template;
calculating a attribute complexity value of the class "CarAssembler" as 2×1=2PD based on <attribute base_effort="1" unit="PD"> in the template; and
calculating the complexity value of the class "CarAssembler" itself as 1×1=1PD based on <Class base_effort= "1" unit= "PD"> in the template.

---

Thus, the total complexity value of the class "CarAssembler" is 4+2+1=7PD.

Thus, the total complexity value for the "CarAssembler" class is calculated as a sum of the individual complexity value for the "CarAssembler" class and the individual complexity values for the operation and attribute subclasses of the "CarAssembler" class. The individual complexity value for each subclass (i.e., operation subclass and attributes subclass) of the "CarAssembler" class is computed as a product of the unit task complexity value for each subclass and the number of elements in each subclass of the "CarAssembler" class, Besides, according to <risk base_buffer="4" unit="PD"> in the template, it is calculated that a buffer complexity value of the class "CarAssembler" is 4PD.

Besides calculation of the complexity values, also parsed out is dependency information that the class "CarAssembler" is dependent on the class "WheelProducer".

Therefore, after the above calculated complexity values and the dependency information are added to the basic data entries, the result is shown in FIG. 4E.

Figure 5:
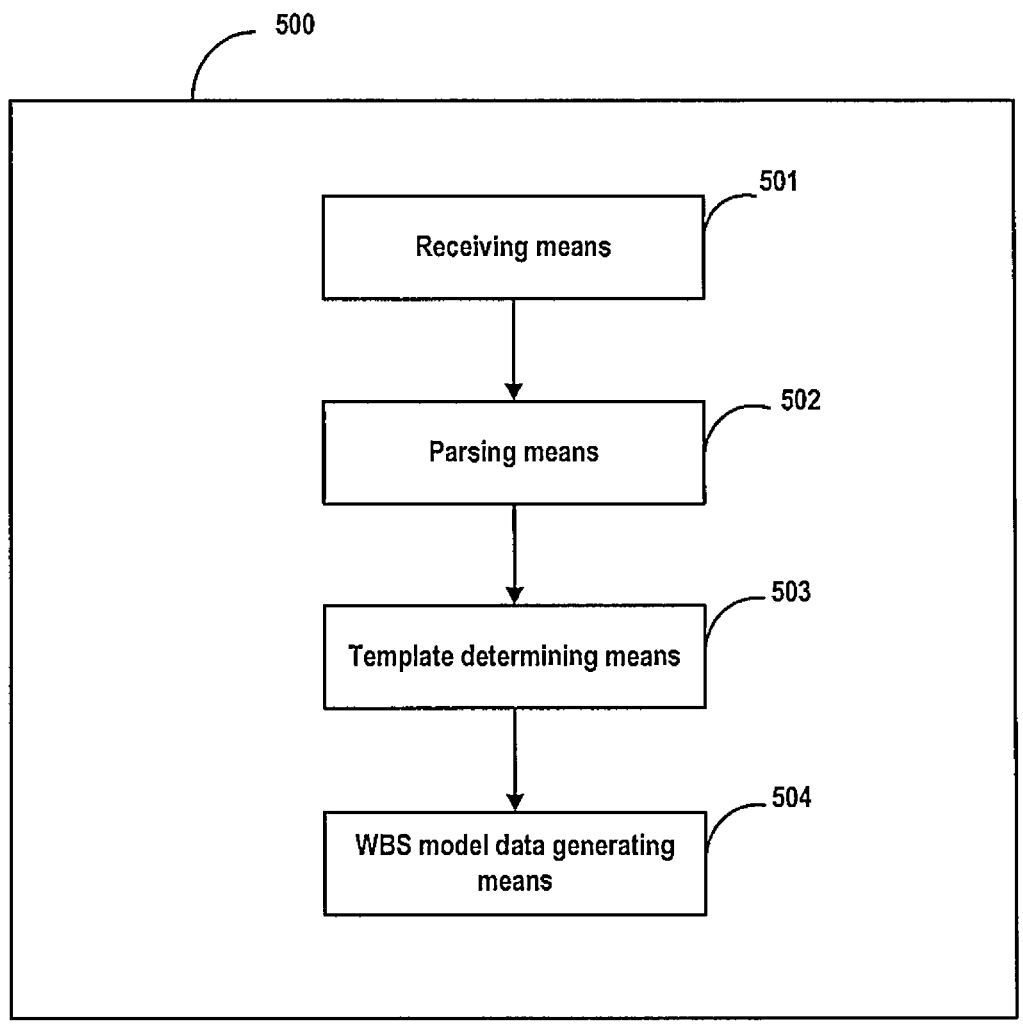
FIG. 5 shows a block diagram of a system of generating work breakdown structure WBS model data based on design model data, according to embodiments of the present invention.

FIG. 5 shows a block diagram of a system for generating work breakdown structure WBS model data based on design model data according to one embodiment of the present invention. The system shown in FIG. 5 is generally indicated by system 500. Specifically, the system 500 comprises receiving means 501 configured to receive design model data; parsing means 502 configured to parse WBS metadata of the design model data; template determining means 503 configured to determine a WBS template corresponding to the design model data; and WBS model data generating means 504 configured to generate WBS model data using the determined WBS template and the parsed WBS metadata. It should be understood that means 501-504 in the system 500 correspond to steps 201-204 in the method shown in FIG. 2, respectively, and thus will not be detailed here.

Further, in the system 500, according to one embodiment of the present invention, the WBS model data generating means 504 is further configured to extract granularity information in the WBS template; determine a granularity of WBS model data to be generated using the extracted granularity information in the WBS template; and generate basic data entries of the WBS model data using the determined granularity of the WBS model data and the parsed WBS metadata.

According to one embodiment of the present invention, the WBS model data generating means 504 in the system 500 is further configured to extract unit task complexity data in the WBS template; calculate complexity values of data entries in the WBS model data using the unit task complexity data and the WBS metadata in the design model data; and add the complexity values into the data entries. According to one embodiment of the present invention, the unit task complexity data in the WBS template include one or more of the following data: internal complexity data, external complexity data, and buffer complexity data.

According to a further embodiment of the present invention, the WBS model data generating means 504 is further configured to extract dependency information in the parsed WBS metadata; and add the extracted dependency information into the data entries.

According to one embodiment of the present invention, the template determining means 503 is configured to identify template information of the design model data; and to determine a WBS template corresponding to the design model data using the identified template information.

According to one embodiment of the present invention, the parsing means 502 is configured to parse one or more of the following metadata in the design model data: component, program class, operations in the program class, and dependency between program classes.

According to one embodiment of the present invention, the system 500 further comprises: updating means configured to automatically generate updated WBS model data in response to change of the design model data. It should be noted that although the updating means is not explicitly shown in FIG. 5, the updating means may constitute a component of the system 500.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. It should be appreciated that all such changes, substitutions and amendments still fall within the protection scope of the present invention. The protection scope of the present invention is defined by the appended claims.

What is claimed is:

1. A method for generating a work breakdown structure (WBS) model data and executing work tasks, in an execution sequence derived from the WBS model data, during development of an application, said method comprising:

a processor of a computer system receiving design model data from a computer file that contains the design model data in a Unified Modeling Language (UML) format, wherein the design model data comprises a description of what the application may include, wherein the design model data is based on a development objective of the application in a specified industry of car manufacturing, wherein the design model data comprises a plurality of classes that includes a first class of CarAssembler and a second class of WheelProducer, wherein the first class comprises an operation subclass and an attribute subclass, wherein the operation subclass includes N operations, wherein the attribute subclass includes M attributes, wherein N is at least 2, and wherein M is at least 2;

said processor automatically parsing the design model data in the UML format to extract WBS metadata from the design model data, wherein the extracted WBS metadata comprises the N operations and the M attributes;

said processor automatically extracting, from the computer file, a format identifier that identifies the design model data as being in the UML format;

said processor automatically determining a WBS template corresponding to the design model data, wherein the WBS template includes structural information pertaining to the WBS model data to be generated, wherein the WBS template is formulated with respect to the specified industry, wherein said determining the WBS template comprises determining the WBS template in the UML format in response to the format identifier having identified the design model data as being in the UML format, wherein the WBS template comprises the work tasks to be executed during the development of the application including during stages of design, implementation, and test of the application, wherein the application includes functional components, classes, and operations included in the classes, and wherein the WBS template comprises a value ($V_C$) of unit task complexity for the first class, a value ($V_O$) of unit task complexity for each operation of the N operations, and a value ($V_A$) of unit task complexity for each attribute of the M attributes;

said processor automatically generating the WBS model data by mapping data, including mapping the work tasks, contained in the determined WBS template in the UML format to the extracted WBS metadata and outputting a result of the mapping as the WBS model data, wherein the WBS model data comprises data entries and a total complexity value, wherein each data entry is associated with a respective work task of the work tasks in the WBS template, and wherein said generating the WBS model data comprises: calculating the total complexity value as equal to $V_C+N*V_O+M*V_A$; and inserting the calculated total complexity value into the WBS model data, wherein the WBS template further comprises a value of a risk complexity for the first class, wherein said generating the WBS model data further comprises inserting the value of the risk complexity into the WBS model data, and wherein said generating the WBS model data further comprises: (i) determining a dependency relationship from the extracted WBS metadata, wherein the dependency relationship denotes that the first class of CarAssembler is dependent upon prior implementation of the second class of WheelProducer; and (ii) using the determined dependency relationship to order the work tasks in WBS model data;

in response to the design model data being modified, said processor automatically regenerating the WBS model data by performing said automatically parsing the modified design model data, said automatically extracting, said automatically determining a WBS template, and said automatically generating the WBS model data; and said processor using the WBS model data to break down the respective work tasks and arrange an execution sequence of the respective work tasks for executing the respective work tasks in the execution sequence during the development of the application including during the stages of design, implementation, and test of the application.

2. The method of claim 1, wherein the WBS template further comprises a value of a risk complexity for the first class, and wherein said generating the WBS model data further comprises inserting the value of the risk complexity into the WBS model data.

3. The method of claim 1, wherein N=2 and M=2.

4. A computer program product, comprising a computer readable hardware storage device having computer readable program code stored therein, said program code containing instructions which, upon being executed by a processor of a computer system, implement a method for generating a work breakdown structure (WBS) model data and executing work tasks, in an execution sequence derived from the WBS model data, during development of an application, said method comprising:

said processor receiving design model data from a computer file that contains the design model data in a Unified Modeling Language (UML) format, wherein the design model data comprises a description of what the application may include, wherein the design model data is based on a development objective of the application in a specified industry of car manufacturing, wherein the design model data comprises a plurality of classes that includes a first class of CarAssembler and a second class of WheelProducer, wherein the first class comprises an operation subclass and an attribute subclass, wherein the operation subclass includes N operations, wherein the attribute subclass includes M attributes, wherein N is at least 2, and wherein M is at least 2;

said processor extracting, from the computer file, a format identifier that identifies the design model data as being in the UML format;

said processor automatically parsing the design model data in the UML format to extract WBS metadata from the design model data, wherein the extracted WBS metadata comprises the N operations and the M attributes;

said processor automatically extracting, from the computer file, a format identifier that identifies the design model data as being in the UML format;

said processor automatically determining a WBS template corresponding to the design model data, wherein the WBS template includes structural information pertaining to the WBS model data to be generated, wherein the WBS template is formulated with respect to the specified industry, wherein said determining the WBS template comprises determining the WBS template in the UML format in response to the format identifier having identified the design model data as being in the UML format, wherein the WBS template comprises the work tasks to be executed during the development of the application including during stages of design, implementation, and test of the application, wherein the application includes functional components, classes, and operations included in the classes, and wherein the WBS template comprises a value ($V_C$) of unit task complexity for the first class, a value ($V_O$) of unit task complexity for each operation of the N operations, and a value ($V_A$) of unit task complexity for each attribute of the M attributes;

said processor automatically generating the WBS model data by mapping data, including mapping the work tasks, contained in the determined WBS template in the UML format to the extracted WBS metadata and outputting a result of the mapping as the WBS model data, wherein the WBS model data comprises data entries and a total complexity value, wherein each data entry is associated with a respective work task of the work tasks in the WBS template, and wherein said generating the WBS model data comprises: calculating the total complexity value as equal to $V_C+N*V_O+M*V_A$; and inserting the calculated total complexity value into the WBS model data, wherein the WBS template further comprises a value of a risk complexity for the first class, wherein said generating the WBS model data further comprises inserting the value of the risk complexity into the WBS model data, and wherein said generating the WBS model data further comprises: (i) determining a dependency relationship from the extracted WBS metadata, wherein the dependency relationship denotes that the first class of CarAssembler is dependent upon prior implementation of the second class of WheelProducer; and (ii) using the determined dependency relationship to order the work tasks in WBS model data;

in response to the design model data being modified, said processor automatically regenerating the WBS model data by performing said automatically parsing the modified design model data, said automatically extracting, said automatically determining a WBS template, and said automatically generating the WBS model data; and said processor using the WBS model data to break down the respective work tasks and arrange an execution sequence of the respective work tasks for executing the respective work tasks in the execution sequence during the development of the application including during the stages of design, implementation, and test of the application.

5. The computer program product of claim 4, wherein the WBS template further comprises a value of a risk complexity for the first class, and wherein said generating the WBS model data further comprises inserting the value of the risk complexity into the WBS model data.

6. The computer program product of claim 4, wherein N=2 and M=2.

7. A computer system comprising a processor, a memory coupled to the processor, and a computer readable storage device coupled to the processor, said storage device containing program code which, upon being executed by the processor, implements a method for generating a work breakdown structure (WBS) model data and executing work tasks, in an execution sequence derived from the WBS model data, during development of an application, said method comprising:

said processor receiving design model data from a computer file that contains the design model data in a Unified Modeling Language (UML) format, wherein the design model data comprises a description of what the application may include, wherein the design model data is based on a development objective of the application in a specified industry of car manufacturing, wherein the design model data comprises a plurality of classes that includes a first class of CarAssembler and a second class of WheelProducer, wherein the first class comprises an operation subclass and an attribute subclass, wherein the operation subclass includes N operations, wherein the attribute subclass includes M attributes, wherein N is at least 2, and wherein M is at least 2;

said processor automatically parsing the design model data in the UML format to extract WBS metadata from the design model data, wherein the extracted WBS metadata comprises the N operations and the M attributes;

said processor automatically extracting, from the computer file, a format identifier that identifies the design model data as being in the UML format;

said processor automatically determining a WBS template corresponding to the design model data, wherein the WBS template includes structural information pertaining to the WBS model data to be generated, wherein the WBS template is formulated with respect to the specified industry, wherein said determining the WBS template comprises determining the WBS template in the UML format in response to the format identifier having identified the design model data as being in the UML format, wherein the WBS template comprises the work tasks to be executed during the development of the application including during stages of design, implementation, and test of the application, wherein the application includes functional components, classes, and operations included in the classes, and wherein the WBS template comprises a value ($V_C$) of unit task complexity for the first class, a value ($V_O$) of unit task complexity for each operation of the N operations, and a value ($V_A$) of unit task complexity for each attribute of the M attributes;

said processor automatically generating the WBS model data by mapping data, including mapping the work tasks, contained in the determined WBS template in the UML format to the extracted WBS metadata and outputting a result of the mapping as the WBS model data, wherein the WBS model data comprises data entries and a total complexity value, wherein each data entry is associated with a respective work task of the work tasks in the WBS template, and wherein said generating the WBS model data comprises: calculating the total complexity value as equal to $V_C+N*V_O+M*V_A$; and inserting the calculated total complexity value into the WBS model data, wherein the WBS template further comprises a value of a risk complexity for the first class, wherein said generating the WBS model data further comprises inserting the value of the risk complexity into the WBS model data, and wherein said generating the WBS model data further comprises: (i) determining a dependency relationship from the extracted WBS metadata, wherein the dependency relationship denotes that the first class of CarAssembler is dependent upon prior implementation of the second class of WheelProducer; and (ii) using the determined dependency relationship to order the work tasks in WBS model data;

in response to the design model data being modified, said processor automatically regenerating the WBS model data by performing said automatically parsing the modified design model data, said automatically extracting, said automatically determining a WBS template, and said automatically generating the WBS model data; and said processor using the WBS model data to break down the respective work tasks and arrange an execution sequence of the respective work tasks for executing the respective work tasks in the execution sequence during the development of the application including during the stages of design, implementation, and test of the application.

8. The computer system of claim 7, wherein the WBS template further comprises a value of a risk complexity for the first class, and wherein said generating the WBS model data further comprises inserting the value of the risk complexity into the WBS model data.

9. The computer system of claim 7, wherein N=2 and M=2.

* * * * *